(12) United States Patent
Ishibashi et al.

(10) Patent No.: US 7,313,077 B2
(45) Date of Patent: Dec. 25, 2007

(54) OPTICAL DISK DEVICE AND EMISSION CURRENT ADJUSTING METHOD FOR THE SAME

(75) Inventors: Eisuke Ishibashi, Oonojou (JP); Yasuhiro Wada, Oonojou (JP); Shinya Shimizu, Kadoma (JP); Toshiya Akagi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 556 days.

(21) Appl. No.: 11/033,959

(22) Filed: Jan. 13, 2005

(65) Prior Publication Data

US 2005/0157625 A1 Jul. 21, 2005

(30) Foreign Application Priority Data

Jan. 13, 2004 (JP) ............... P. 2004-005263

(51) Int. Cl.
*G11B 7/00* (2006.01)
(52) U.S. Cl. ............... 369/116; 369/124.01; 369/59.11
(58) Field of Classification Search ............ None
See application file for complete search history.

(56) References Cited

U.S. PATENT DOCUMENTS

2006/0280080 A1* 12/2006 Hsu et al. ............... 369/47.53

2007/0036056 A1* 2/2007 Seo ............... 369/59.13
2007/0036059 A1* 2/2007 Masui et al. ............... 369/116

FOREIGN PATENT DOCUMENTS

JP 2000030276 1/2000

* cited by examiner

*Primary Examiner*—Muhammad Edun
(74) *Attorney, Agent, or Firm*—Stevens, Davis, Miller & Mosher, LLP

(57) ABSTRACT

A ratio of an erase current and a peak current when starting recording is defined as K=iER/iPK (S1), and iER11 is set equal to K×iPK1, and an ideal value iER11 of an erase current that should be increased according to a temperature change is determined (S2). A value obtained by subtracting a current iBT at a bottom level emission intensity when starting recording from a current at an erase level emission intensity after the temperature rises is defined as iER1. By measuring this iER1, an ideal value iER11 of the erase current is subtracted from iER1, and the resultant current is defined as iBT11 (S3). This iBT11 is set as an adjustment value of the bottom current, and a value obtained by adding this adjustment value to a bottom current when starting recording is set as a bottom current after change.

14 Claims, 9 Drawing Sheets

US 7,313,077 B2

OPTICAL DISK DEVICE AND EMISSION CURRENT ADJUSTING METHOD FOR THE SAME

BACKGROUND OF THE INVENTION

The present invention relates to an optical disk device for recording and reproducing data on and from an optical disk by an optical pickup, and a method for adjusting an emission current of a laser in an optical disk device.

As optical disk devices, devices for CD-ROMs, CD-R/RWs, and DVDs have already been made practicable, and these are actively applied to various fields and developed for higher performance. Particularly, recently, along with rapid market expansion of personal computers, the diffusion ratio thereof in the form installed in personal computers has also increased.

FIG. 10 is a block diagram of a pickup control part of an optical disk device.

Operations of a pickup control part according to prior arts are described with reference to FIG. 10. In FIG. 10, the pickup module 2 comprises a spindle motor 3 for rotating an optical disk 1, an optical pickup 4 for recording and reproducing data signals of the optical disk 1, and a feed part 6 for moving a carriage 5 on which the optical pickup 4 is mounted in the radius direction of the optical disk 1. The feed part 6 comprises a feed motor 7, a gear (not shown), and a screw shaft (not shown), etc., and is constructed so that the carriage 5 moves between the inner circumference and the outer circumference of the optical disk 1 when the feed motor 7 is rotated.

An analog signal processing part 8 generates a focus error signal and a tracking error signal on the basis of a signal output from an optical sensor (not shown) inside the optical pickup 4 within the carriage 5 provided inside the pickup module 2, and outputs the signals to the servo processing part 9.

The focus error signal shows deviation between a light beam spot outputted from an objective lens (not shown) provided in the optical pickup 4 and the recording surface of the optical disk 1 in the focal direction. The tracking error signal shows deviation between the light spot and the data track of the optical disk 1 in the optical disk radius direction. The analog signal processing part 8 generates a lens position signal showing the relative positional relationship between the objective lens and the carriage 5 by extracting the low-band components of the tracking error signal, and outputs the signal to the motor drive part 10.

The servo processing part 9 comprises an ON/OFF circuit, an operation circuit, a filter circuit, and an amplifier circuit, etc., focus/tracking-controls the objective lens so that the light beam spot follows the data track of the optical disk 1, and furthermore, performs feed-control so that the objective lens maintains a roughly neutral- position by using the low-band components of the tracking error signal.

The digital signal processing part 11 comprises a data slicer, a data PLL circuit, a jitter measuring circuit, an error correction part, a modulating/demodulating part, a buffer memory, and a laser control part, etc., and transfers signals to the host (HOST in the figure) side as effective data.

In recording operations, data transmitted from the host is modulated by the digital signal processing part 11, a predetermined current is supplied to a laser light source (not shown) inside the optical pickup 4 via the laser drive part 12 by the laser control part to make the laser light source emit light in a pulsed manner, and performs recording on the data track of the optical disk 1. The controller 13 controls the entirety of the servo part thus constructed.

An example of a method for controlling the recording power in the optical disk device is described in Japanese Unexamined Patent Publication No. 2000-30276.

In the case of a medium for both recording and reproduction like a CD-RW and a DVD-RW, for forming bits, the recording emission waveform like the waveform of the recording emission intensity of FIG. 6 is formed. This recording emission waveform forms bits by repeating rapid-heating and rapid-cooling on a medium by repeating high power and low power light beams. Namely, with respect to an erase level for erasing recorded data, a peak level at a higher emission intensity level and a bottom level at a lower emission intensity level are alternately formed.

In order to realize this recording emission waveform, a current pattern to be supplied to the laser light source is shown in FIG. 7. A current to be supplied for obtaining bottom level emission intensity is a bottom current (iBT), and for obtaining erase level emission intensity, a current obtained by adding an erase current (iER) to the bottom current (iBT) is supplied. Furthermore, in order to obtain peak level emission intensity, a current further added with a peak current (iPK) is supplied.

The construction of D/A converters to be used for generating these emission currents is shown in FIG. 8. The D/A converter for generating a bottom current (iBT) is a bottom DAC, the D/A converter for generating an erase current (iER) is an erase DAC, and the D/A converter for generating a peak current (iPK) is a peak DAC. To obtain the bottom level emission intensity by currents generated by these D/A converters, only the bottom current (iBT) is supplied to the laser light source. To obtain the erase level emission intensity, a current being the sum of the bottom current (iBT) and the erase current (iER) is supplied to the laser light source. To obtain the peak level emission intensity, a current being the sum of the bottom current (iBT), the erase current (iER), and the peak current (iPK) is supplied to the laser light source.

The relationship between the current flowing in the laser light source and the emission intensity of the laser light source changes depending on the temperature of the laser due to influences from the laser's own heating and the ambient temperature. At a starting time of recording, the temperature is low, so that the threshold as the minimum current value necessary for emission is low, and the inclination of the increase in the emission intensity according to an increase in current is steep, however, during recording, due to an increase in temperature of the laser, the threshold becomes higher and the inclination of the emission intensity with respect to an increase in current becomes smaller. Therefore, in order to obtain desired emission intensity, adjustment of the current according to the temperature change of the laser becomes necessary.

For this current adjustment, it is not possible to directly detect the bottom level change, so that erase power of the emission intensity is detected, and on the basis of this result, an estimate value of the bottom level change is determined, and according to this, the bottom current (iBT) is adjusted. However, in this method, the bottom level adjustment is always based on the estimate value from the erase power of the emission intensity, so that this method cannot cope with a case where an unexpected source of change occurs, and accuracy is not sufficient. Therefore, the emission intensity level cannot be properly maintained, and the bottom level scatters and harmfully influences the recording performance, resulting in inaccurate data recording.

SUMMARY OF THE INVENTION

The present invention was made for solving the above-mentioned problem, and an object thereof is to provide an optical disk device which can accurately set the emission intensity level of the laser light source and accurately performs data recording.

An emission current adjusting method for an optical disk device for recording and reproducing data by irradiating an optical disk with a laser beam in an emission intensity pattern composed of a peak level at which the emission intensity is maximum, a bottom level at which the emission intensity is minimum, and an erase level as the intermediate value between said levels, wherein an adjustment value of the bottom current after starting recording is determined from measured value and an ideal value of the erase current after starting recording.

Since the bottom current after starting recording is determined from measured value and an ideal value of the erase current that changes due to a temperature rise along with recording, the change in erase current can be directly reflected on the bottom current, whereby the setting of the bottom current is accurate, and a desired emission intensity can be obtained by making the bottom current accurately follow the temperature rise. Even when an unexpected source of change occurs, a change in erase current is directly reflected on the bottom current, so that such a source of change can be detected by measurement of the erase current, whereby the bottom current can be prevented from scattering regardless of the source of change, and excellent recording performance can be maintained.

DESCRIPTION OF THE PREFERRED EMBODIMENTS

Hereinafter, an emission intensity level adjusting method for an optical disk device and an optical disk device relating to an embodiment of the present invention are described with reference to an example and the drawings. The drawings are schematic views, and do not dimensionally accurately show the positions.

Figure 1:
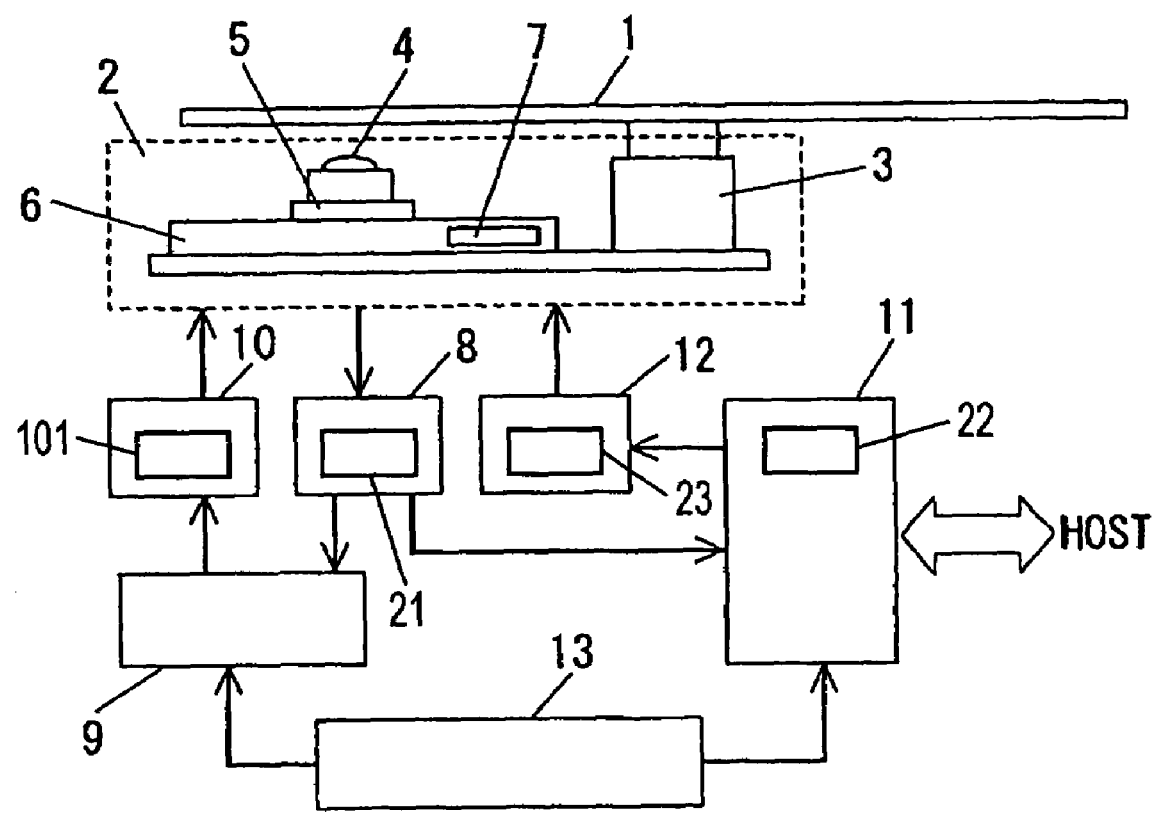
FIG. 1 is a block diagram of a pickup control part of an optical disk device according to the present invention.

Operations of the pickup control part in this example are described. In FIG. 1, the pickup module 2 comprises a spindle motor 3 for rotating an optical disk 1, an optical pickup 4 for reading data signals of the optical disk 1, and a feed part 6 for moving a carriage 5 on which the optical pickup 4 is mounted in the radius direction of the optical disk 1. The feed part 6 comprises a feed motor 7, a gear (not shown), a screw shaft (not shown), etc., and is constructed so that the carriage 5 moves between the inner circumference and the outer circumference of the optical disk 1 by rotating the feed motor 7.

On the basis of signal outputs from an optical sensor (not shown) inside the optical pickup 4 in the carriage 5 provided inside the pickup module 2, the analog signal processing part 8 generates a focus error signal and a tracking error signal and outputs these to the servo processing part 9. Furthermore, the analog signal processing part 8 extracts low-band components of the tracking error signal to generate a lens position signal showing the relative positional relationship between the objective lens and the carriage 5, and outputs this to the motor drive part 10. The motor drive part 10 has a motor driver IC 101. The analog signal processing part 8 includes the sample hold circuit 21 shown in FIG. 4.

The servo processing part 9 comprises an ON/OFF circuit, an operation circuit, a filter circuit, and an amplifier circuit, etc., performs focus/tracking-controlling of an objective lens so that the light beam spot follows the data track of the optical disk 1, and further performs feed-controlling by using the low-band components of the tracking error signal so that the objective lens maintains a roughly neutral position.

The digital signal processing part 11 comprises a data slicer, a data PLL circuit, a jitter measuring circuit, an error correction part, a modulating/demodulating part, a buffer memory, and a laser control part, etc., and transfers effective data to the host (HOST in the figure) side. The digital signal processing part 11 includes the power control part 22 shown in FIG. 4.

At the time of recording, data transmitted from the host is modulated by the digital signal processing part 11, a predetermined current is supplied to a light source such as a laser (not shown) inside the optical pickup 4 via the laser drive part 12 by the laser control part to make the light source emit light in, for example, a pulsed manner, whereby recording on the data track of the optical disk 1 is performed. The laser drive part 12 includes the laser driver (LDD) 23 shown in FIG. 4. The controller 13 controls the entirety of the servo part thus constructed.

Figure 9:
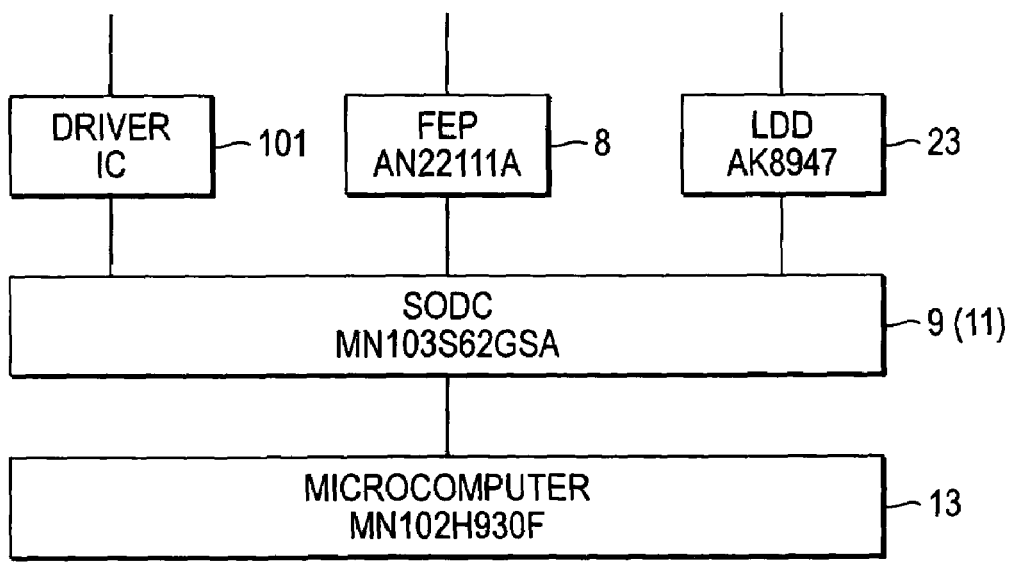
FIG. 9 is a circuit block diagram of the pickup control part of an optical disk device.
Figure 10:
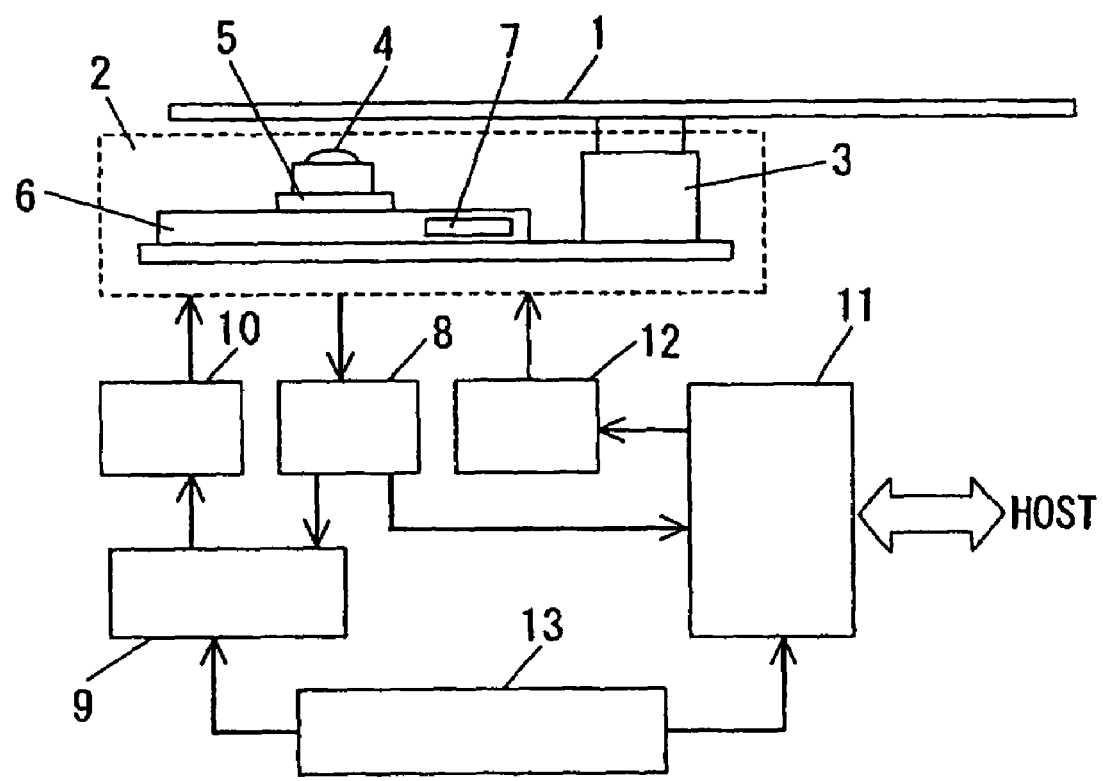
FIG. 10 is a block diagram of a pickup control part of an optical disk device.

FIG. 9 shows an example of the circuitry. The controller 13 consists of a 16-bit single chip microcomputer (MN102H930F made by Semiconductor Company, MATSUSHITA ELECTRIC INDUSTRIAL CO., LTD.) including an A/D converter, a D/A converter, and a RAM (10 kB memory). The servo processing part 9 and the digital signal processing part 11 consist of one-chip optical disk controllers (SODC), and employ the product No. MN103S62GSA made by Semiconductor Company, MATSUSHITA ELECTRIC INDUSTRIAL CO., LTD. The analog signal processing part 8 consists of the front end processor (FEP) of the product No. AN22111A made by Semiconductor Company, MATSUSHITA ELECTRIC INDUSTRIAL CO., LTD. For the laser driver 23 of the laser drive part 12, as an example, the laser driver AK8947 made by ASAHI KASEI MICROSYSTEM CO., LTD., is used.

The emission current adjusting method is described with reference to FIG. 2 and FIG. 3.

Figure 2:
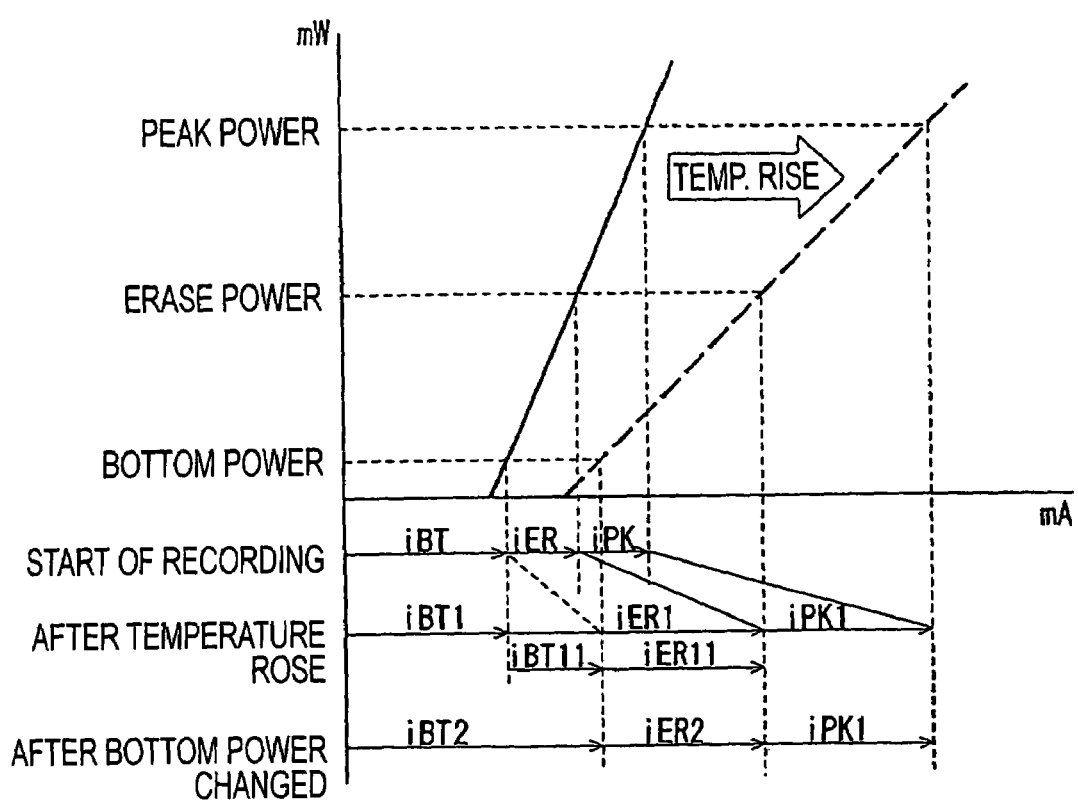
FIG. 2 is a diagram showing the relationship between the emission intensity level of a laser light source and the emission current of the laser light source.

In FIG. 2, the horizontal axis shows the current to be supplied to the laser light source, and the vertical axis shows the emission intensity of the laser light source. The solid line shows the relationship between the emission current and the emission intensity at the time of recording start, and the dashed line shows the relationship between the emission current and the emission intensity when the temperature rises due to recording. At the time of recording start, the temperature is low, so that the threshold as a minimum current value necessary for emission is low, and the inclination of emission intensity with respect to the current increase is steep, and on the other hand, during recording, due to the temperature rise, the threshold becomes higher and the inclination of the emission intensity with respect to the current increase becomes smaller.

At the time of recording start, the current to be supplied to obtain a bottom level emission intensity is the bottom current (iBT), and to obtain an erase level emission intensity, a current obtained by adding an erase current (iER) to the bottom current (iBT) is supplied. In order to obtain a peak level emission intensity, a current obtained by further adding a peak current (iPK) is supplied.

When the laser temperature rises due to recording, at the respective emission levels, currents higher than those at the time of recording start become necessary, and the bottom current to be supplied for obtaining the bottom level emission intensity is the sum of iBT and iBT11, and for obtaining the erase level emission intensity, a current obtained by adding the erase current iER11 to the bottom current becomes necessary. In order to obtain the peak level emission intensity, a current obtained by further adding the peak current iPK1 is supplied. Therefore, it becomes an issue how to determine accurately the iBT11 and iER11.

Settings of the addition current iBT11 and iER11 according to the temperature rise are described with reference to FIG. 3.

The ratio of the erase current and the peak current at the time of recording start is defined as K=iER/iPK (S1). This constant K is defined as an amount unchangeable even when the temperature changes.

By using this K, an ideal value iER11 of the erase current to be increased according to the peak current iPK1 increased due to a temperature rise is determined by defining iER11=K×iPK1 (S2). It is also possible that the ideal value of the erase current is determined by calculating the ratio of the erase power to the peak power from target peak power and target erase power set before starting recording, and multiplying this ratio by the peak current after starting recording.

Next, a current obtained by subtracting the current iBT at the bottom level of the emission intensity at the time of recording start from the current at the erase level of the emission intensity after the temperature rise is defined as iER1. By measuring this iER1, the ideal value iER11 of the erase current is subtracted from iER1, and the obtained current is defined as iBT11 (S3). This iBT11 is an adjustment value for the bottom current, and the following level comparison is made for the iBT11.

In this level comparison, it is judged whether or not iBT11 is larger than the current value S corresponding to the LSB (Least Significant Bit) of the bottom DAC as a bottom current generating D/A converter, and when iBT11>S, the value of bottom DAC is incremented by 1 to increase the bottom current (S5). Namely, the LSB is the least significant bit in the case of expression according to the binary system, and when the iBT11 set as an adjustment value for the bottom current exceeds this least significant bit, the bottom current is increased by changing the value of the bottom DAC.

When iBT11 is not larger than S, it is judged whether or not the iBT11 is smaller than −T, where T is a current value corresponding to LSB of the bottom DAC (S6), and when iBT11<−T, the value of the bottom DAC is decremented by 1 to reduce the bottom current (S7). Thus, normally, level comparison of iBT11 is performed by comparison with the LSB current value of the bottom DAC, however, it is also possible that the bottom current is increased or reduced by comparison with the current value of an integral multiple of the LSB current value of the bottom DAC.

When all the conditions of judgements in S4 and S6 are not satisfied, the value of the bottom DAC is maintained and the bottom current is not changed.

The iBT11 thus determined is added to iBT as shown in FIG. 2 and the resultant value is defined as iBT2, and is used as a bottom current after a bottom power change due to a temperature rise. Furthermore, iER11 is defined as the erase current iER2 after the temperature rise. As the peak current, iPK1 is set without change as the peak current after the temperature rise.

Figure 4:
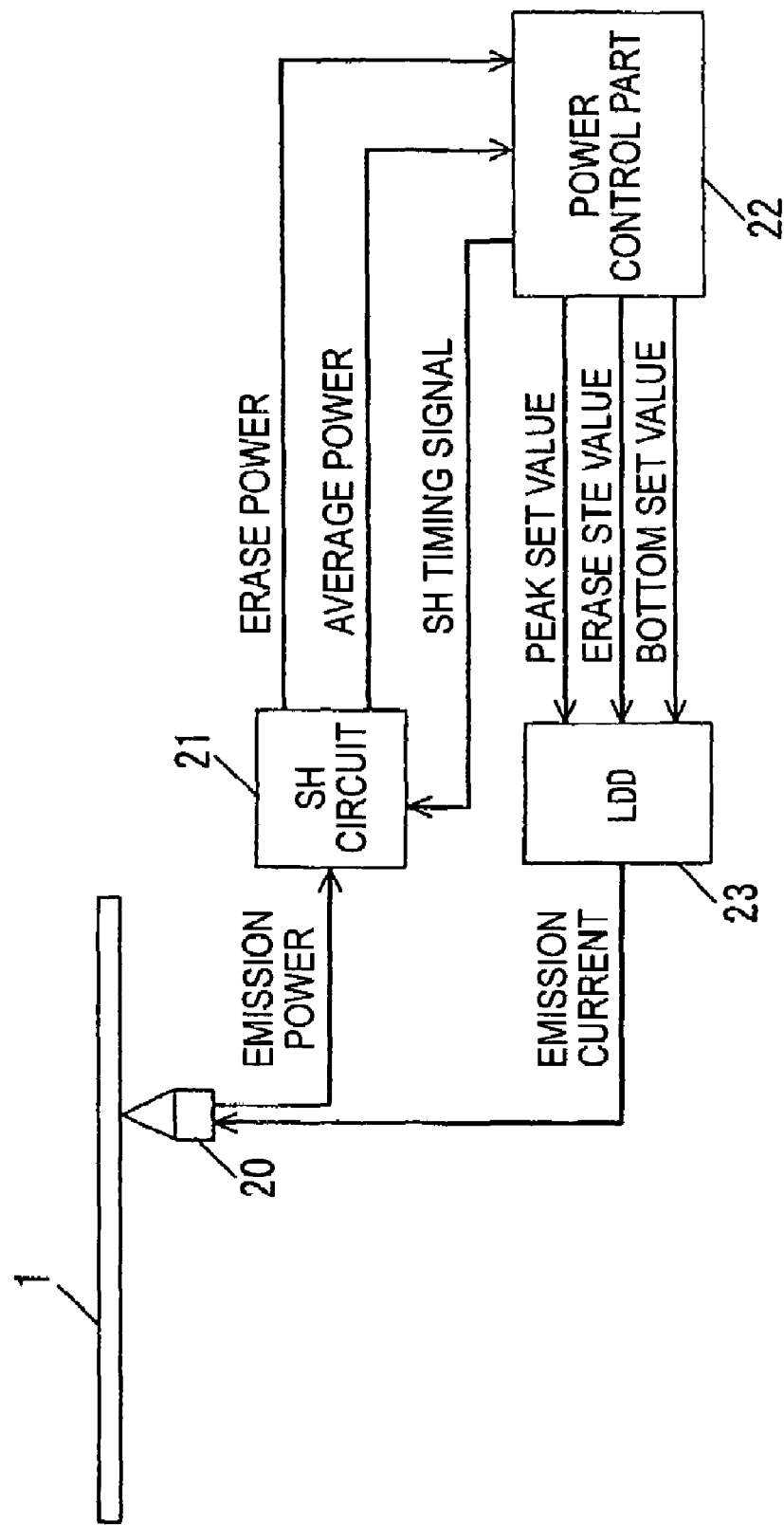
FIG. 4 is a block diagram for realizing an emission current adjusting method.

FIG. 4 shows a block diagram for realizing the above-mentioned emission current adjusting method. The waveform data of the emission intensity pattern of the laser unit 20 for outputting a laser beam to be irradiated onto the optical disk 1 is transmitted to the sample hold circuit (SH circuit) 21, and the erase power and the average power are detected by the sample hold circuit (SH circuit) 21 and inputted into the power control part 22. Furthermore, the power control part 22 transmits a sample hold (SH) timing signal to the sample hold circuit (SH circuit) 21 and sets the sampling timing of the sample hold circuit (SH circuit) 21.

Figure 3:
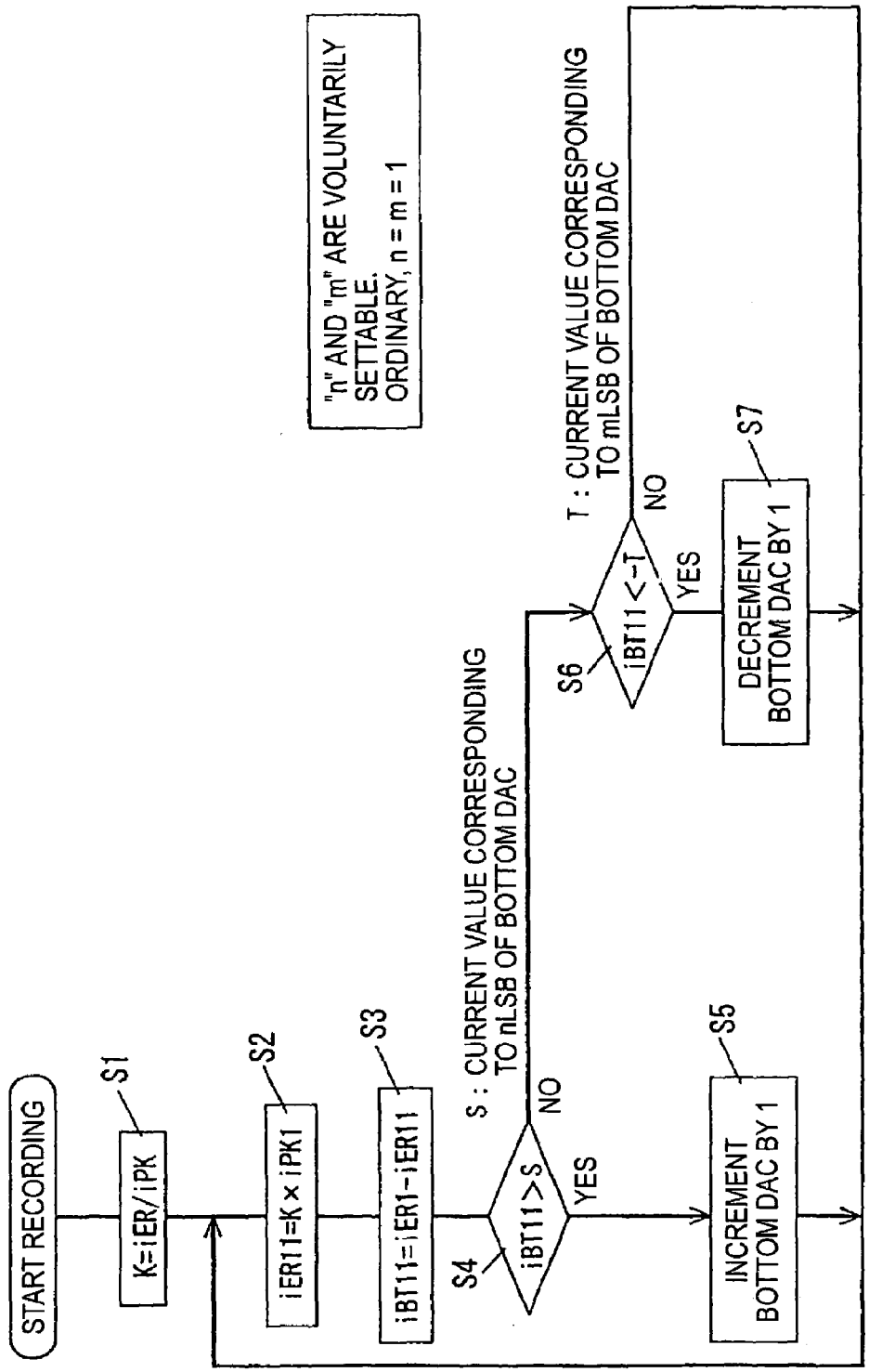
FIG. 3 is a flowchart for controlling the bottom current.

The power control part 22 performs the processing shown in FIG. 3 on the basis of the inputted erase power and average power, determines set values of the peak current, the erase current, and the bottom current that change according to temperature rise due to recording, and the set values are transmitted to the laser driver 23.

Figure 5:
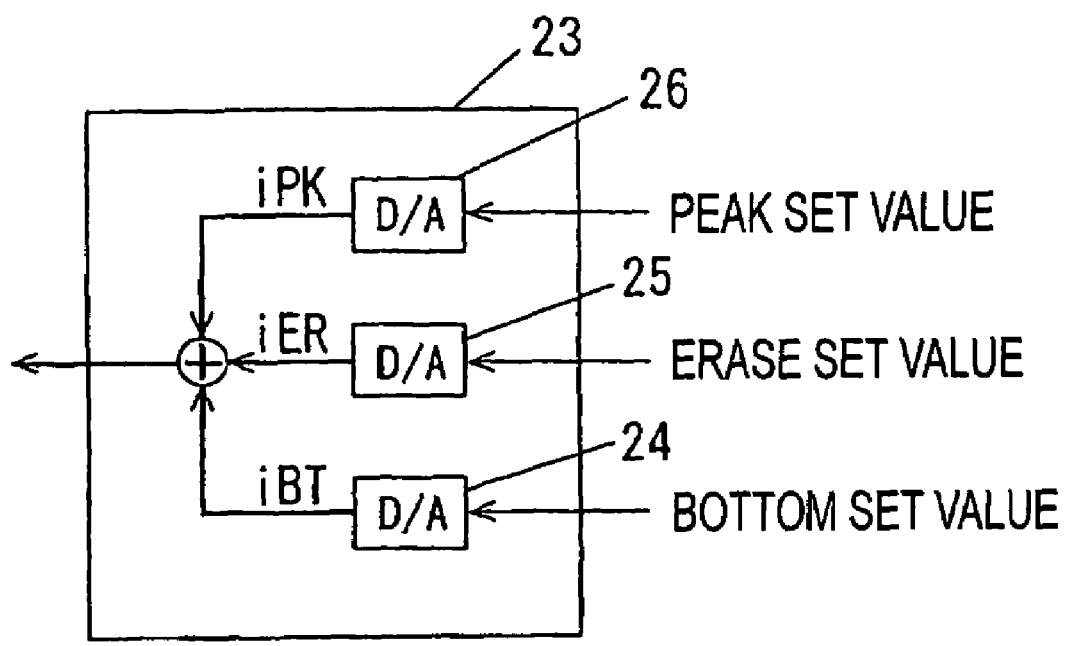
FIG. 5 is a diagram showing the construction of a laser driver.
Figure 6:
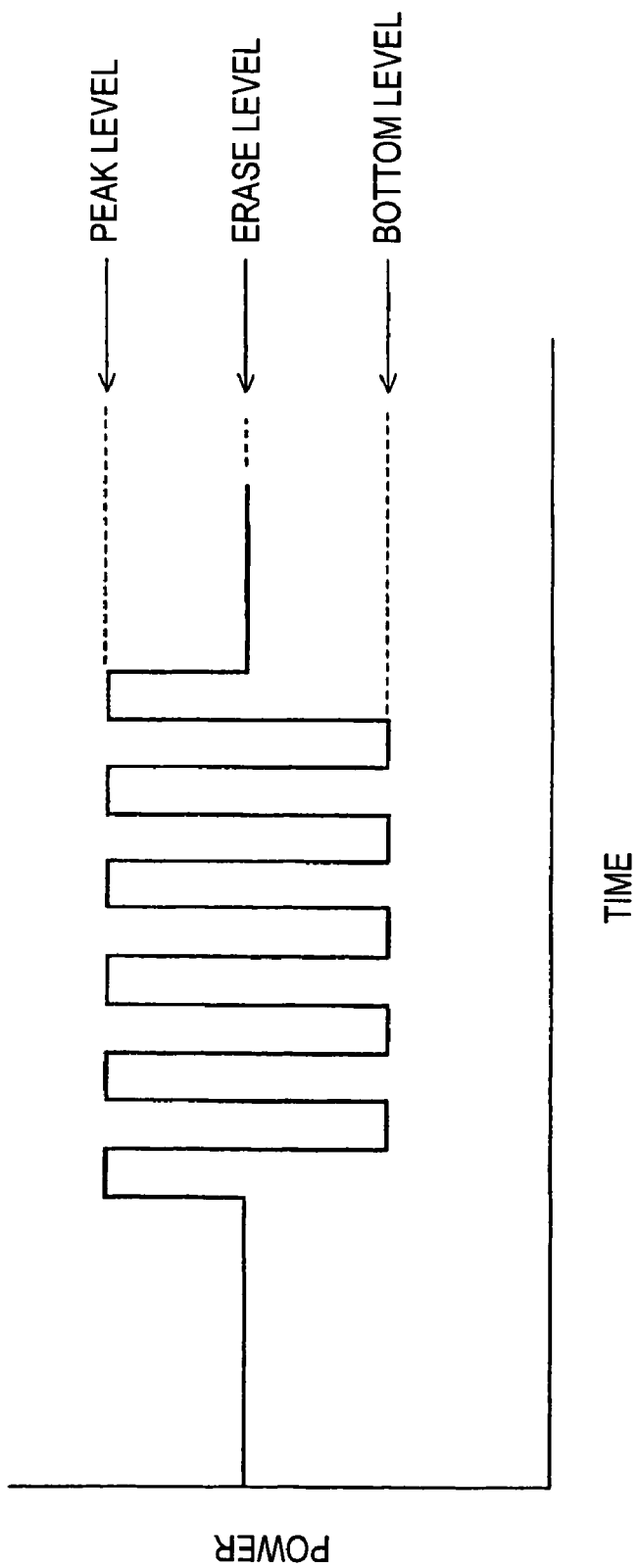
FIG. 6 is a diagram showing a waveform of the recording emission intensity.
Figure 7:
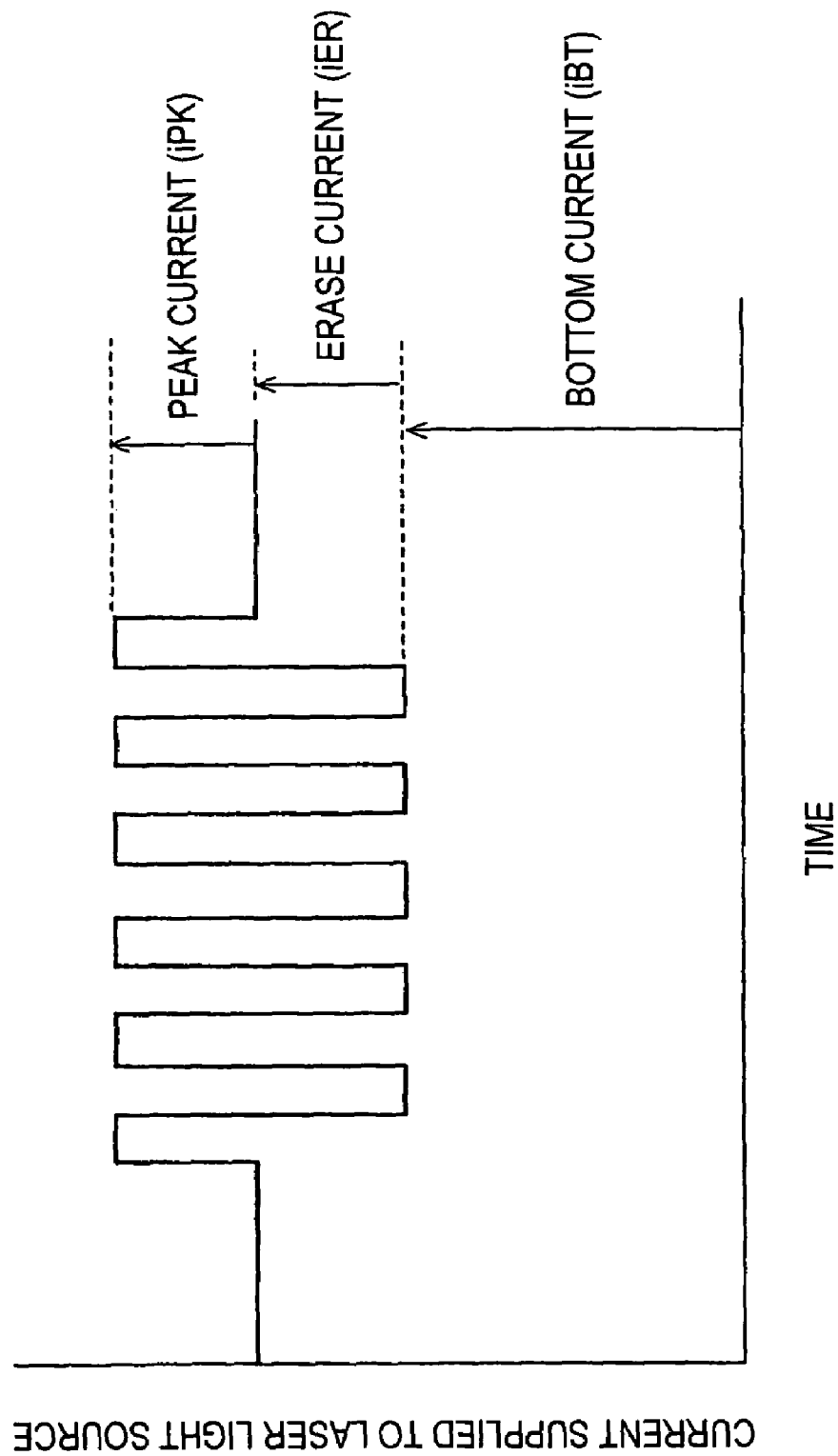
FIG. 7 is a diagram showing a pattern of a current to be supplied to the laser light source.
Figure 8:
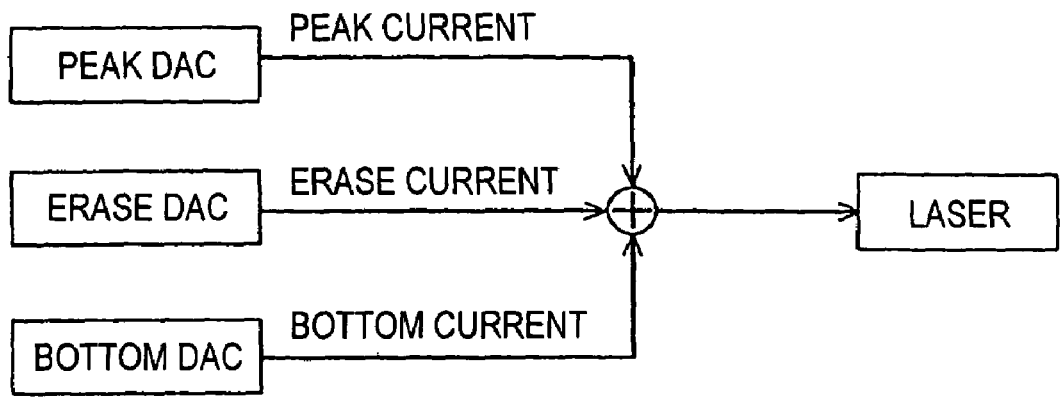
FIG. 8 is a diagram showing the construction of a D/A converter to be used for generating an emission current.

The construction of the laser driver 23 is shown in FIG. 5. The laser driver 23 comprises a D/A converter 24 for generating a bottom current (iBT), a D/A converter 25 for generating an erase current (iER), and a D/A converter 26 for generating a peak current (iPK). The bottom current set value, the erase current set value, and the peak current set value are transmitted to the respective D/A converters 24, 25, and 26 and D/A-converted, whereby the bottom current (iBT), the erase current (iER), and the peak current (iPK) are generated.

In the case of obtaining the bottom level emission intensity, only the bottom current (iBT) is supplied to the laser unit 20. In the case of obtaining the erase level emission intensity, a current being the sum of the bottom current (iBT) and the erase current (iER) is supplied to the laser unit 20. In the case of obtaining the peak level emission intensity, a current being the sum of the bottom current (iBT), the erase current (iER), and the peak current (iPK) is supplied to the laser unit 20.

Herein, the bottom current after being changed is determined from a measured value and an ideal value of the erase current that changes according to a temperature rise due to recording, so that the erase current change can be directly reflected on the bottom current, and the bottom current setting becomes accurate and a desired emission intensity can be obtained by accurately following the temperature rise. Furthermore, even when an unexpected source of change occurs, the erase current change is directly reflected on the bottom current, so that such a source of change can be detected by measuring the erase current, and therefore, the bottom current can be prevented from scattering regardless of the source of change, and excellent recording performance can be maintained.

This application is based upon and claims the benefit of priority of Japanese Patent Application No. 2004-5263 filed on Jan. 13, 2004, the contents of which are incorporated herein by reference in its entirety.

What is claimed is:

1. An emission current adjusting method for an optical disk device, which is irradiated with a laser beam to perform recording and reproduction of data, the laser beam is driven by emission currents including a current for generating a peak level emission intensity; a current for generating a minimum bottom level emission intensity; and a current for generating an erase level emission intensity between the peak and bottom levels, the emission current adjusting method comprising the steps of:

obtaining an ideal value of an erase current after recording is started;

measuring an erase current after recording is started; and determining an emission current after recording is started based on, wherein a bottom current is defined as the current which generates the minimum bottom level emission intensity, an erase current is defined by subtracting the bottom current from the current which generates the erase level emission intensity, and a peak current is defined by subtracting the erase current from the current which generates the peak level emission intensity.

2. The emission current adjusting method as claimed in claim 1, wherein a bottom current after recording is started is determined based on the measured value and the ideal value of the erase current after recording is started.

3. The emission current adjusting method as claimed in claim 1, wherein a bottom current adjustment value after recording is started is determined based on a measured value and an ideal value of the erase current after recording is started.

4. The emission current adjusting method as claimed in claim 3, wherein a value obtained by adding the adjustment value to a bottom current at starting of recording is set as a bottom current after recording is started, and the erase current ideal value is set as an erase current after recording is started.

5. The emission current adjusting method as claimed in claim 4, wherein the ideal value of the erase current is obtained by multiplying a ratio of an erase current to a peak current at starting of recording by a peak current after recording is started.

6. The emission current adjusting method as claimed in claim 4, wherein the erase current ideal value is obtained by multiplying a ratio of erase power to peak power calculated from target peak power and target erase power set before starting recording by a peak current after starting recording.

7. The emission current adjusting method as claimed in claim 1, wherein the ideal value of the erase current is obtained by multiplying a ratio of an erase current to a peak current at starting of recording by a peak current after recording is started.

8. The emission current adjusting method as claimed in claim 1, wherein the erase current ideal value is obtained by multiplying a ratio of erase power to peak power calculated from target peak power and target erase power set before starting recording by a peak current after starting recording.

9. An optical disk device, comprising:

a sample hold circuit which generates an emission intensity waveform by emission currents including a current for generating a peak level emission intensity, a current for generating a minimum bottom level emission intensity; and a current for generating an erase level emission intensity between the peak and bottom levels, and detects at least an erase level by sampling the emission intensity waveform;

a power control part which calculates an adjustment value of a bottom current after recording is started from a measured value and an ideal value of the erase current after recording is started, and calculates a set value of the bottom current on the basis of the adjustment value; and a laser driver for generating an emission current on the basis of the set value of the bottom current, wherein a bottom current is defined as the current which generates the minimum bottom level emission intensity, an erase current is defined by subtracting the bottom current from the current which generates the erase level emission intensity, and a peak current is defined by subtracting the erase current from the current which generates the peak level emission intensity.

10. The optical disk device as claimed in claim 9, wherein the laser driver comprises a bottom current generating digital-to-analog converter, an erase current generating digital-to-analog converter, and a peak current generating digital-to-analog converter, and emission currents are generated by the respective converters on the basis of the set value of the bottom current determined on the basis of the bottom current adjustment value after recording is started, that is calculated from a measured value and an ideal value of the erase current after recording is started.

11. An optical disk device, comprising:

a sample hold circuit which generates an emission intensity waveform by emission currents including a current for generating a peak level emission intensity, a current for generating a minimum bottom level emission intensity; and a current for generating an erase level emission intensity between the peak and bottom levels, and detects at least an erase level by sampling the emission intensity waveform;

a power control part which calculates an adjustment value of a bottom current after recording is started from a measured value and an ideal value of the erase current after recording is started, and calculates a set value of the erase current on the basis of the adjustment value; and a laser driver for generating an emission current on the basis of the set value of the erase current, wherein a bottom current is defined as the current which generates the minimum bottom level emission intensity, an erase current is defined by subtracting the bottom current from the current which generates the erase level emission intensity, and a peak current is defined by subtracting the erase current from the current which generates the peak level emission intensity.

12. The optical disk device as claimed in claim 11, wherein the laser driver comprises a bottom current generating digital-to-analog converter, an erase current generating digital-to-analog converter, and a peak current generating digital-to-analog converter, and emission currents are generated by the respective converters on the basis of the set value of the erase current determined on the basis of the bottom current adjustment value after recording is started, that is calculated from a measured value and an ideal value of the erase current after recording is started.

13. An optical disk device, comprising:

a sample hold circuit which generates an emission intensity waveform by emission currents including a current for generating a peak level emission intensity, a current for generating a minimum bottom level emission intensity, and a current for generating an erase level emission intensity between the peak and bottom levels, and detects at least an erase level by sampling the emission intensity waveform;

a power control part which calculates an adjustment value of a bottom current after recording is started from a measured value and an ideal value of the erase current after recording is started, and calculates a set value of the peak current on the basis of the adjustment value; and a laser driver for generating an emission current on the basis of the set value of the peak current, wherein a bottom current is defined as the current which generates the minimum bottom level emission intensity, an erase current is defined by subtracting the bottom current from the current which generates the erase level emission intensity, and a peak current is defined by subtracting the erase current from the current which generates the peak level emission intensity.

14. The optical disk device as claimed in claim 13, wherein the laser driver comprises a bottom current generating digital-to-analog converter, an erase current generating digital-to-analog converter, and a peak current generating digital-to-analog converter, and emission currents are generated by the respective converters on the basis of the set value of the peak current determined on the basis of the bottom current adjustment value after recording is started, that is calculated from a measured value and an ideal value of the erase current after recording is started.

* * * * *